(12) United States Patent
Liu et al.

(10) Patent No.: US 11,946,485 B2
(45) Date of Patent: Apr. 2, 2024

(54) AIR INTAKE BYPASS RECIRCULATION STRUCTURE WITH ADJUSTABLE AIR ENTRAINING AMOUNT AND CONTROLLABLE BROADBAND NOISE

(71) Applicant: Harbin Engineering University, Harbin (CN)

(72) Inventors: Chen Liu, Harbin (CN); Zequn Ma, Harbin (CN); Yipeng Cao, Harbin (CN); Runze Zhang, Harbin (CN); Xinyu Zhang, Harbin (CN); Wenping Zhang, Harbin (CN); Jie Yang, Harbin (CN); Changhong Sun, Harbin (CN); Jie Guo, Harbin (CN); Xiaochen Zhao, Harbin (CN); Gongmin Liu, Harbin (CN)

(73) Assignee: Harbin Engineering University, Harbin (CN)

( * ) Notice: Subject to any disclaimer, the term of this patent is extended or adjusted under 35 U.S.C. 154(b) by 0 days.

(21) Appl. No.: 18/449,065

(22) Filed: Aug. 14, 2023

(65) Prior Publication Data
US 2024/0052849 A1 Feb. 15, 2024

(30) Foreign Application Priority Data
Aug. 15, 2022 (CN) .......................... 202210976763.4

(51) Int. Cl.
*F04D 29/42* (2006.01)
*F04D 29/68* (2006.01)

(52) U.S. Cl.
CPC ....... *F04D 29/4206* (2013.01); *F04D 29/685* (2013.01); *F05D 2220/40* (2013.01)

(58) Field of Classification Search
CPC . F04D 29/4206; F04D 29/685; F05D 2220/40
See application file for complete search history.

(56) References Cited

U.S. PATENT DOCUMENTS 6,648,594 B1 * 11/2003 Horner ................ F04D 29/4213
  415/206
7,475,539 B2 * 1/2009 Chen ................... F04D 27/0207
  415/58.4

(Continued)

FOREIGN PATENT DOCUMENTS

CN 108571472 A 9/2018

*Primary Examiner* — Sabbir Hasan
(74) *Attorney, Agent, or Firm* — AVEK IP, LLC

(57) ABSTRACT

Some embodiments of the disclosure provide an air intake bypass recirculation structure with adjustable air entraining amount and controllable broadband noise which includes main body of the air intake bypass recirculation structure and an air entraining amount adjusting structure. In some examples, an air intake bypass recirculation cavity is formed in the main body of the air intake bypass recirculation structure. An air inlet of an air intake pipe and an air outlet of the air intake pipe are formed in two ends of the main body of the air intake bypass recirculation structure respectively. An airflow inlet of the air intake bypass recirculation structure and an airflow outlet of the air intake bypass recirculation structure are formed in the inner side of the main body of the air intake bypass recirculation structure. The air entraining amount adjusting structure is arranged in the air intake bypass recirculation cavity.

7 Claims, 15 Drawing Sheets

(56) References Cited

U.S. PATENT DOCUMENTS

| | | | | |
|---|---|---|---|---|
| 7,575,411 B2* | 8/2009 | Wood | ............... | F02C 6/12 |
| | | | | 415/58.4 |
| 8,061,974 B2* | 11/2011 | Gu | ............... | F04D 29/685 |
| | | | | 415/58.4 |
| 8,511,083 B2* | 8/2013 | Arnold | ............... | F04D 29/682 |
| | | | | 60/602 |
| 10,107,297 B2* | 10/2018 | Kumar | ............... | F02C 6/12 |
| 10,378,557 B2* | 8/2019 | Burgess | ............... | F04D 29/284 |
| 10,519,974 B2* | 12/2019 | Alcaraz | ............... | F04D 29/663 |
| 10,563,668 B2* | 2/2020 | Jin | ............... | F04D 27/0207 |
| 10,578,048 B2* | 3/2020 | Styles | ............... | F04D 29/441 |
| 10,590,944 B2* | 3/2020 | Hu | ............... | F04D 27/0276 |
| 11,066,982 B2* | 7/2021 | Tomita | ............... | F04D 27/0215 |
| 11,131,312 B2* | 9/2021 | McConville | ............... | F04D 27/0246 |
| 2009/0263234 A1* | 10/2009 | Yin | ............... | F04D 29/685 |
| | | | | 415/58.4 |
| 2014/0093354 A1* | 4/2014 | Sekularac | ............... | F04D 29/685 |
| | | | | 415/58.4 |
| 2015/0159664 A1* | 6/2015 | Olin | ............... | F04D 29/685 |
| | | | | 415/58.2 |
| 2015/0198163 A1* | 7/2015 | Lei | ............... | F04D 29/685 |
| | | | | 415/207 |
| 2017/0350420 A1* | 12/2017 | Lucas | ............... | F04D 29/4213 |

* cited by examiner

AIR INTAKE BYPASS RECIRCULATION STRUCTURE WITH ADJUSTABLE AIR ENTRAINING AMOUNT AND CONTROLLABLE BROADBAND NOISE

CROSS REFERENCE TO RELATED APPLICATIONS

This application claims priority to Chinese application number 202210976763.4, filed on Aug. 15, 2022, the disclosure of which is incorporated by reference herein in its entirety.

FIELD OF THE DISCLOSURE

The disclosure relates generally to the field of turbocharging systems. More specifically, the disclosure relates to air intake bypass recirculation structures.

BACKGROUND

In recent years, in order to meet the requirements of high power and high economic index of modern internal combustion engines, especially the requirements of turbocharged diesel engines for transportation and construction machinery that sufficient turbocharging pressure should be maintained in a wide range of speed and load to obtain satisfactory low-speed performance (economic performance and emission index), a matching turbocharger compressor must be wide in applicable flow range while being high in efficiency. Especially, when the flow rate is small, a high pressure ratio needs to be reached. In this way, the surge line of an air compressor must move towards the direction of a small flow rate. An air intake bypass recirculation system of the air compressor is an effective technical measure to widen the flow range of the air compressor, and has been widely used at present.

With the development of design technology, turbochargers have been developed towards large flow rate and high pressure ratio, and the noise problem of turbochargers has become increasingly prominent. Too large noise is a potential hidden danger for normal operation of equipment, and is also not conducive to normal work and life of workers. A large number of researches have proved that the aerodynamic noise of the air compressor is one of the main noise sources of the turbocharger because of high frequency and high sound pressure level. If the aerodynamic noise of the air compressor is reduced, the whole noise of the turbocharger can be effectively reduced. One of the main ways to reduce noise is to control the noise in the way of noise propagation. At present, adding and installing mufflers is the mostly used way to reduce noise, and there are few measures to reduce noise by changing the structure of the air intake pipe of an air compressor.

To sum up, the noise generated by the air compressor of the existing turbocharged engine is too large, resulting in the problems that the potential hidden danger for normal operation of equipment is increased and it is not conducive to the normal work and life of workers.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, an air intake bypass recirculation structure with adjustable air entraining amount and controllable broadband noise is provided in the present disclosure. The air intake bypass recirculation structure includes main body of the air intake bypass recirculation structure and an air entraining amount adjusting structure, an air intake bypass recirculation cavity is formed in the main body of the air intake bypass recirculation structure along a circumferential direction, an air inlet of an air intake pipe and an air outlet of the air intake pipe are formed in two ends of an inner hole of the main body of the air intake bypass recirculation structure respectively, an airflow inlet of the air intake bypass recirculation structure is formed in one side, close to the air outlet of the air intake pipe, of an inner side face of the main body of the air intake bypass recirculation structure, an airflow outlet of the air intake bypass recirculation structure is formed in another side, close to the air inlet of the air intake pipe, of the inner side face of the main body of the air intake bypass recirculation structure, the airflow inlet of the air intake bypass recirculation structure and the airflow outlet of the air intake bypass recirculation structure are both communicated with the air intake bypass recirculation cavity, and the air entraining amount adjusting structure is arranged in the air intake bypass recirculation cavity and located at the airflow outlet of the air intake bypass recirculation structure, an air circulation area in the air intake bypass recirculation cavity is changed through the air entraining amount adjusting structure to adjust the air entraining amount of the main body of the air intake bypass recirculation structure.

In some embodiments, the main body of the air intake bypass recirculation structure includes an air intake pipe flange, an outer wall of the air intake bypass recirculation structure, a sealed mouth of the air intake bypass recirculation structure and an inner wall of the air intake bypass recirculation structure, one end of the inner wall of the air intake bypass recirculation structure is fixedly connected with an end face of the air intake pipe flange, the outer wall of the air intake bypass recirculation structure sleeves the inner wall of the air intake bypass recirculation structure, one end of the outer wall of the air intake bypass recirculation structure is fixedly connected with the air intake pipe flange, an outer side face of another end, away from the air intake pipe flange, of the inner wall of the air intake bypass recirculation structure is fixedly connected with an inner side face of the outer wall of the air intake bypass recirculation structure through the sealed mouth of the air intake bypass recirculation structure, an outer side face of the end, close to the air intake pipe flange, of the inner wall of the air intake bypass recirculation structure is fixedly connected with the inner side face of the outer wall air intake bypass recirculation structure through inner and outer wall connecting columns, and the air intake bypass recirculation cavity is formed by the air intake pipe flange, the outer wall of the air intake bypass recirculation structure, the sealed mouth of the air intake bypass recirculation structure and the inner wall of the air intake bypass recirculation structure.

In some embodiments, an inner wall of the air intake bypass recirculation structure, an outer wall of the air intake bypass recirculation structure and an air intake pipe flange are coaxially arranged.

In some embodiments, the air intake adjusting structure includes an annular valve and N intra-cavity airflow baffles with increasing diameters from inside to outside, the N intra-cavity airflow baffles are coaxially sleeved in the air intake bypass recirculation cavity between an inner wall of the air intake bypass recirculation structure and an outer wall of the air intake bypass recirculation structure from inside to outside, lengths of the N intra-cavity airflow baffles increase from inside to outside, ends, away from the airflow outlet of the air intake bypass recirculation structure, of the N intra-cavity airflow baffles are flush and fixedly connected with an inner surface of an outer wall of the air intake bypass recirculation structure through baffle connecting columns, the annular valve is sleeved in the air intake bypass recirculation cavity between the inner wall of the air intake bypass recirculation structure and the outer wall of the air intake bypass recirculation structure, the annular valve is located at one side, close to the airflow outlet of the air intake bypass recirculation structure, of the N intra-cavity airflow baffles, the inner surface of the outer wall of the air intake bypass recirculation structure is fixedly connected with sliding rails along the circumferential direction, chutes respectively matched with the sliding rails are formed in an outer surface of the annular valve along the circumferential direction, the annular valve is slidably installed on the outer wall of the air intake bypass recirculation structure through the sliding rails and moves along an axial direction through the sliding rails, and N-1 annular slots matched with the intra-cavity airflow baffles are axially formed in one end, close to the intra-cavity airflow baffles, of the annular valve.

In some embodiments, when N is 2, the intra-cavity airflow baffles include a first intra-cavity airflow baffle and a second intra-cavity airflow baffle, one annular slot is formed in the annular valve, the annular valve is divided into two annular inserting plates arranged coaxially through the annular slot, and a length difference between the second intra-cavity airflow baffle and the first intra-cavity airflow baffle is smaller than a depth of the annular slot.

In some embodiments, the annular inserting plates are equal in length along an axial direction of the annular valve, a spacing between the first intra-cavity airflow baffle and the second intra-cavity airflow baffle and a spacing between the second intra-cavity airflow baffle and the outer wall of the air intake bypass recirculation structure are equal, and the two annular inserting plates are in sliding seal fit with the first intra-cavity airflow baffle, the second intra-cavity airflow baffle and/or the outer wall of the air intake bypass recirculation structure.

In some embodiments, when N is 3, the intra-cavity airflow baffles include a first intra-cavity airflow baffle, a second intra-cavity airflow baffle and a third intra-cavity airflow baffle, two annular slots are formed in the annular valve, the annular valve is divided into three annular inserting plates arranged coaxially through the two annular slots, and a length difference between the third intra-cavity airflow baffle and the first intra-cavity airflow baffle is smaller than a depth of the two annular slots.

In some embodiments, the annular inserting plates are equal in length along an axial direction of the annular valve, a spacing between the first intra-cavity airflow baffle and the second intra-cavity airflow baffle, a spacing between the second intra-cavity airflow baffle and the third intra-cavity airflow baffle and a spacing between the third intra-cavity airflow baffle and the outer wall of the air intake bypass recirculation structure are equal, and the three annular inserting plates are in sliding seal fit with the first intra-cavity airflow baffle, the second intra-cavity airflow baffle, the third intra-cavity airflow baffle and/or the outer wall of the air intake bypass recirculation structure.

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
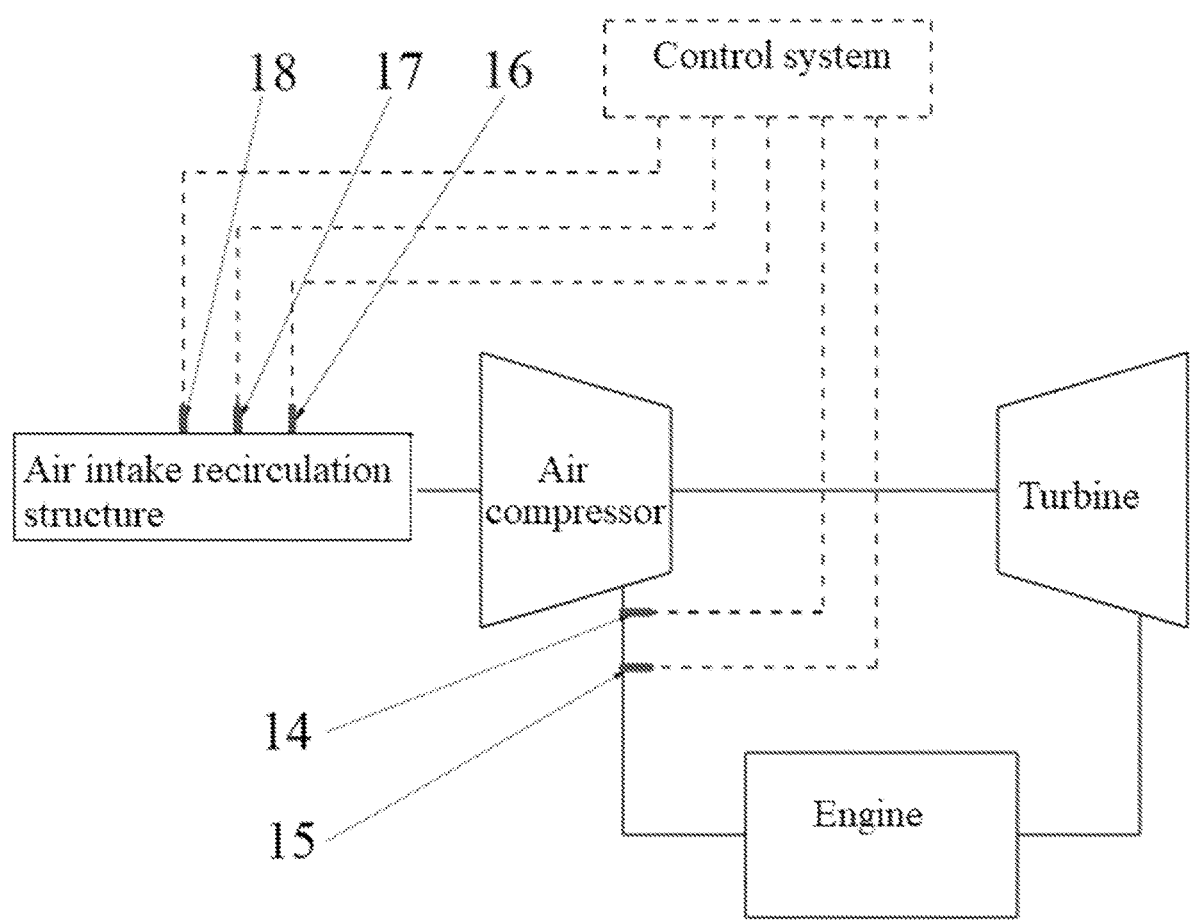
FIG. 1 shows a control system schematic diagram of an air intake bypass recirculation structure with adjustable air entraining amount and controllable broadband noise according to an embodiment of the disclosure.
Figure 2:
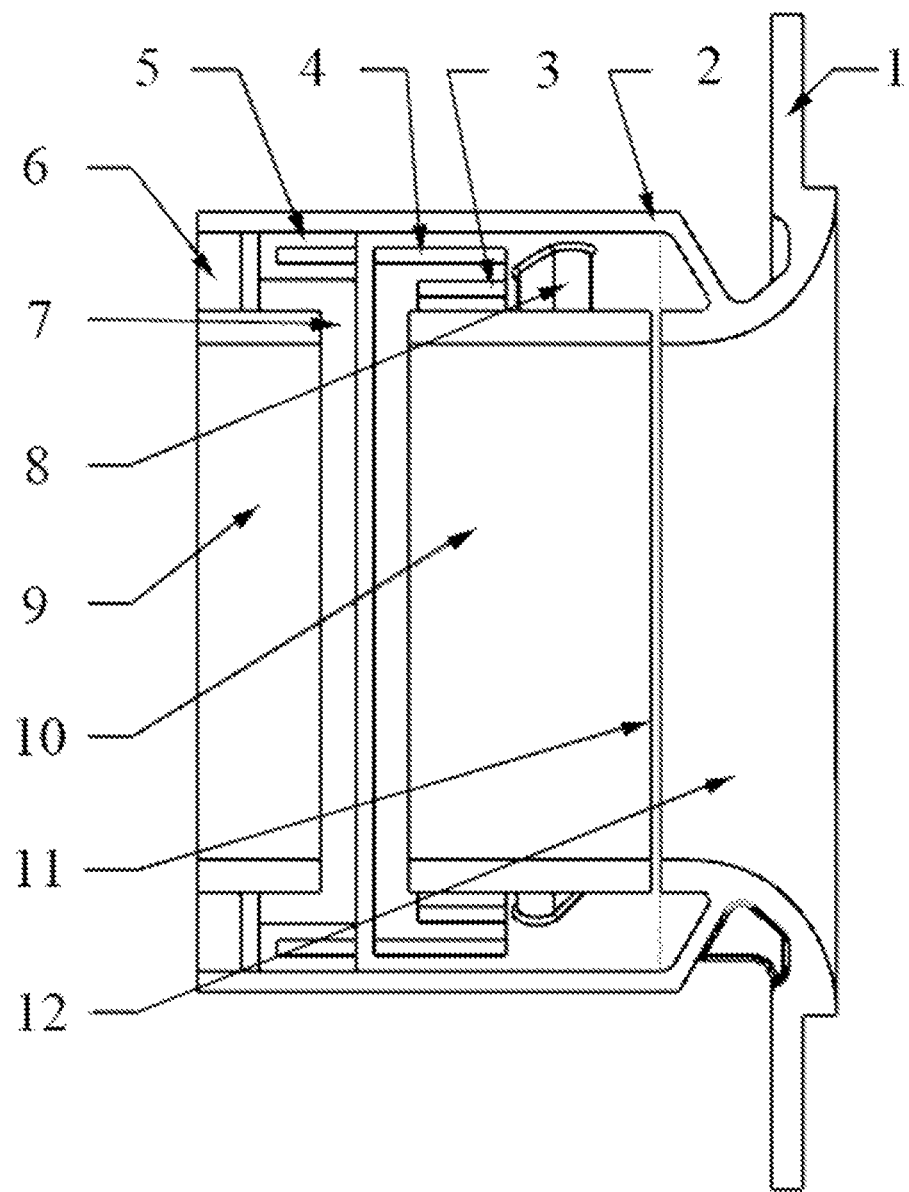
FIG. 2 shows a schematic cross-sectional view of the air intake bypass recirculation structure with adjustable air entraining amount and controllable broadband noise having a double-layer baffle when an annular valve is at a first gear according to an embodiment of the disclosure.
Figure 3:
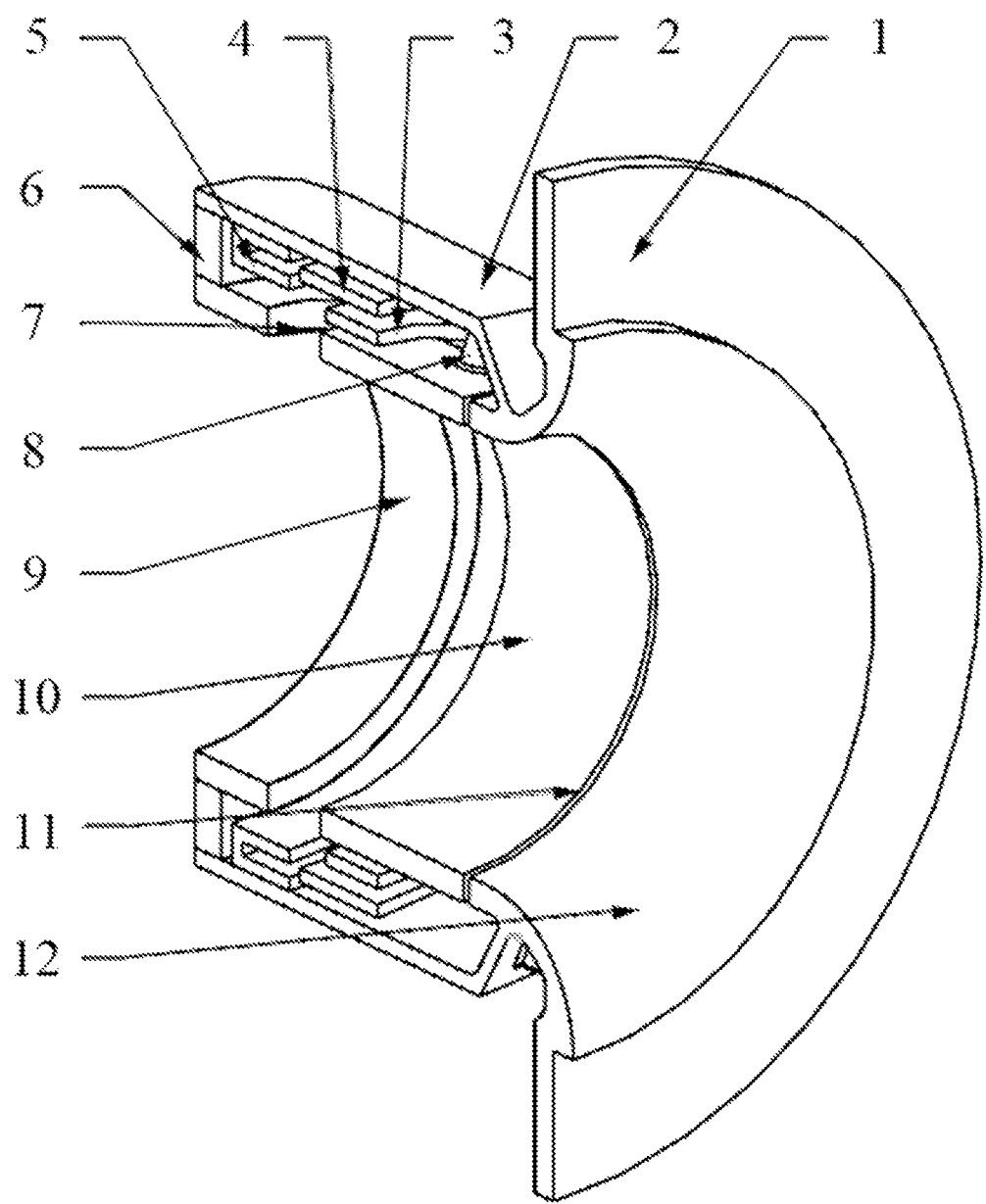
FIG. 3 shows a structural cross-sectional view of the air intake bypass recirculation structure with adjustable air entraining amount and controllable broadband noise having the double-layer baffle when the annular valve is at the first gear according to an embodiment of the disclosure.
Figure 4:
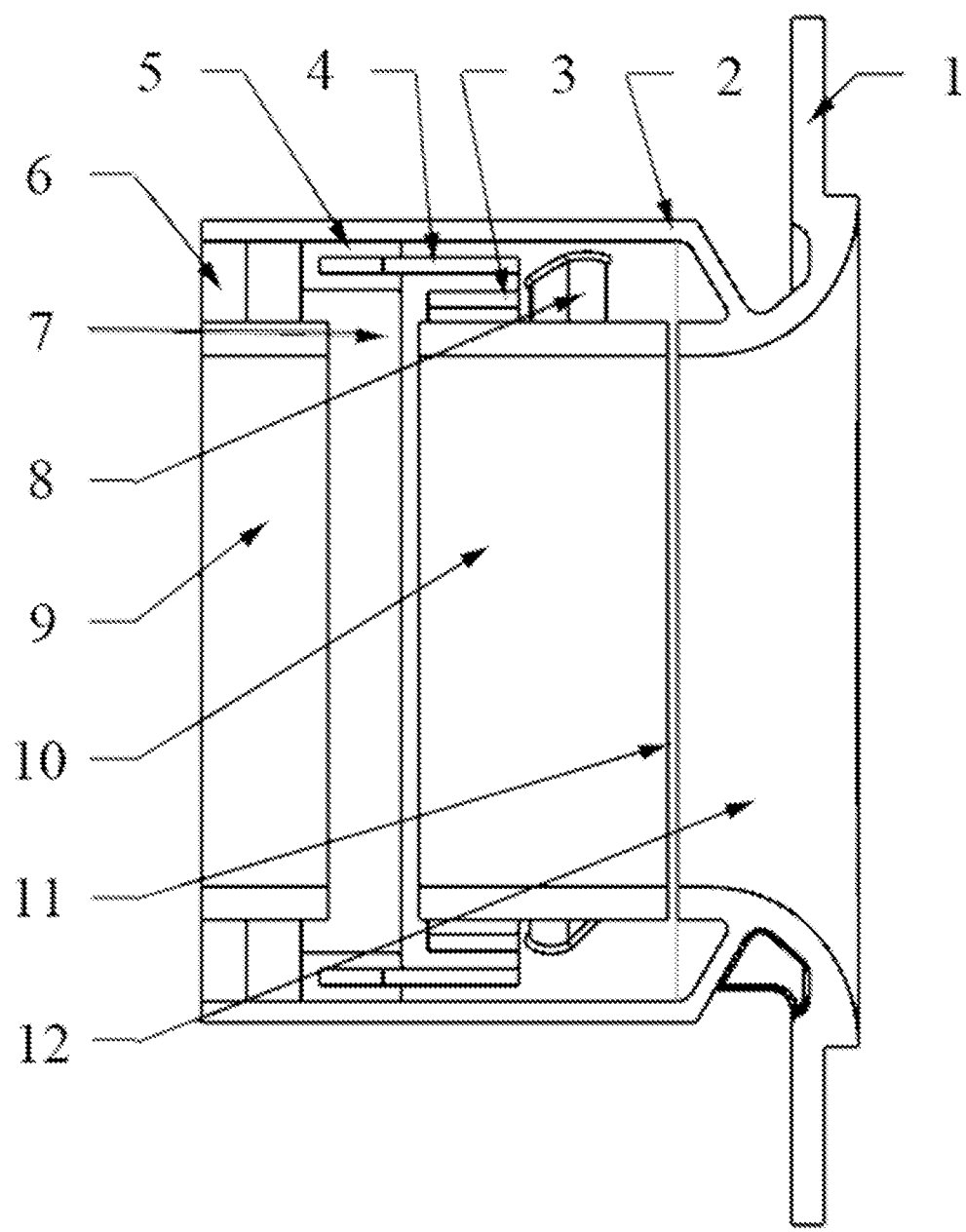
FIG. 4 shows a schematic cross-sectional view of the air intake bypass recirculation structure with adjustable air entraining amount and controllable broadband noise having the double-layer baffle when the annular valve is at a second gear according to an embodiment of the disclosure.
Figure 5:
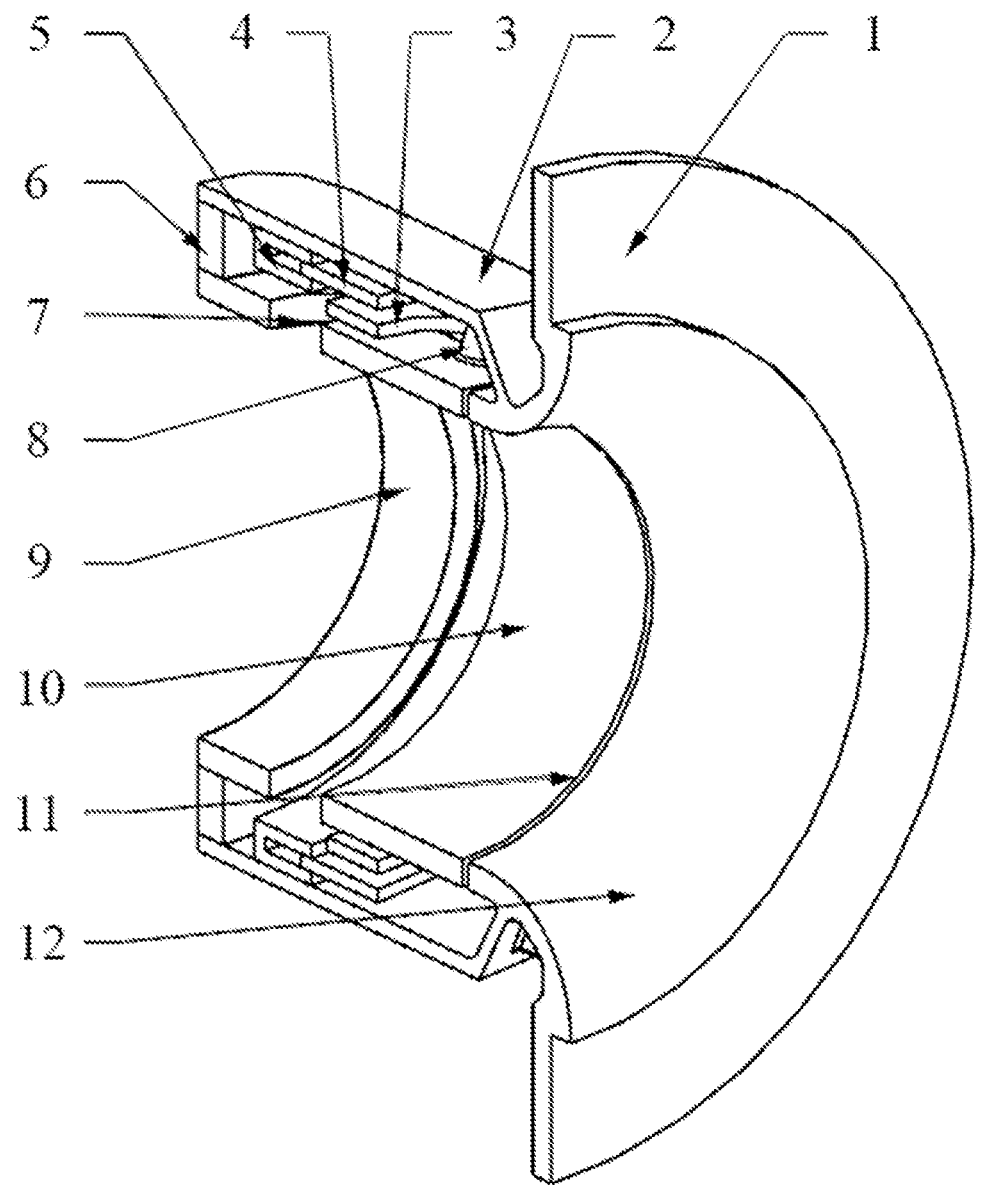
FIG. 5 shows a structural cross-sectional view of the air intake bypass recirculation structure with adjustable air entraining amount and controllable broadband noise having the double-layer baffle when the annular valve is at the second gear according to an embodiment of the disclosure.
Figure 6:
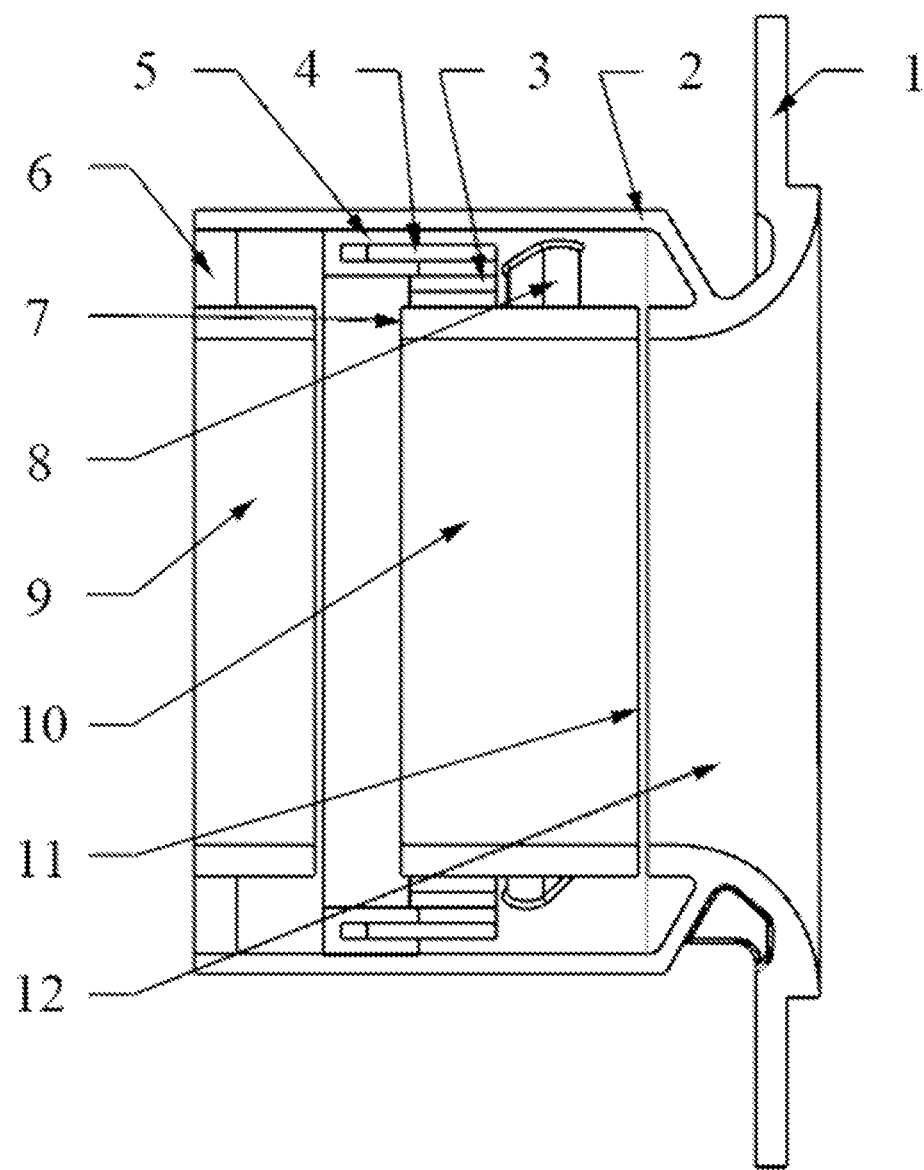
FIG. 6 shows a schematic cross-sectional view of the air intake bypass recirculation structure with adjustable air entraining amount and controllable broadband noise having the double-layer baffle when the annular valve is at a third gear according to an embodiment of the disclosure.
Figure 7:
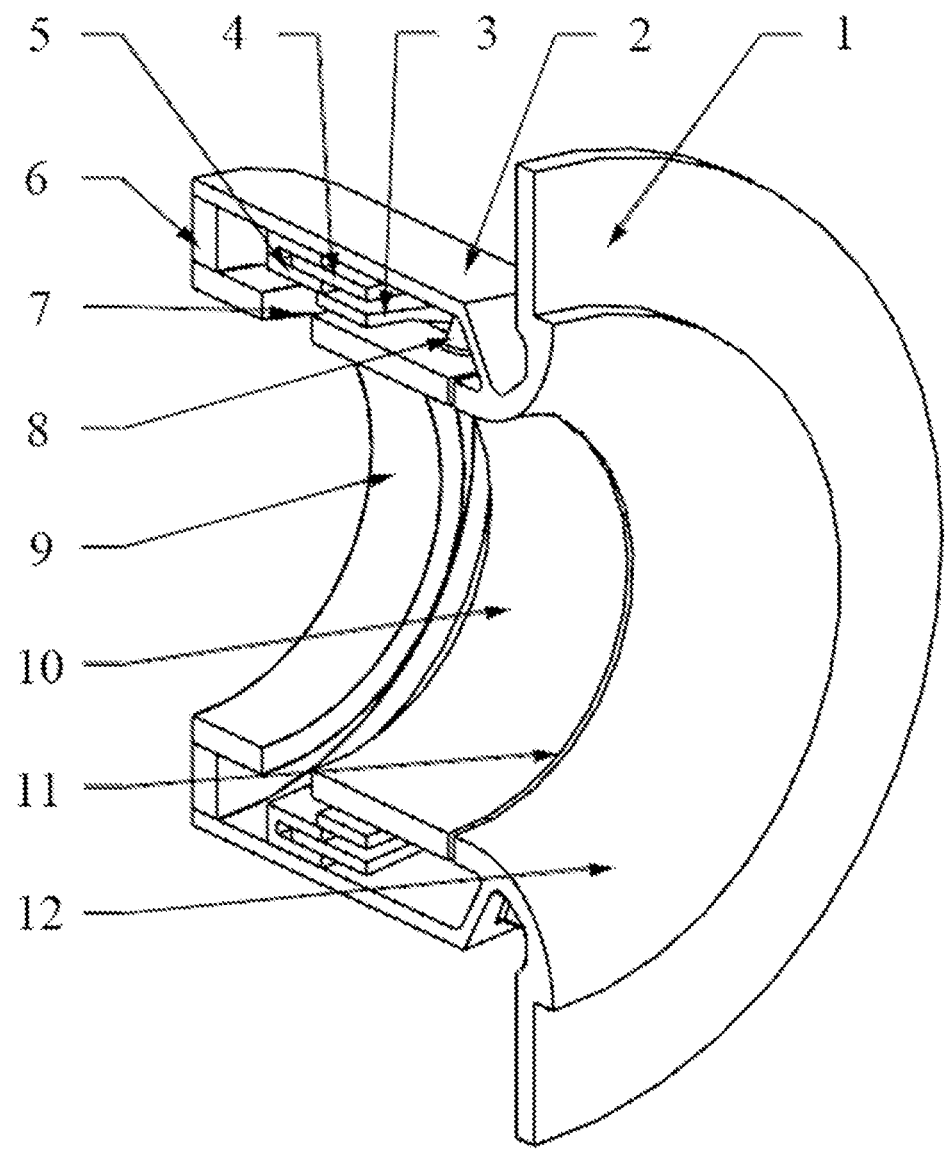
FIG. 7 shows a structural cross-sectional view of the air intake bypass recirculation structure with adjustable air entraining amount and controllable broadband noise having the double-layer baffle when the annular valve is at the third gear according to an embodiment of the disclosure.
Figure 8:
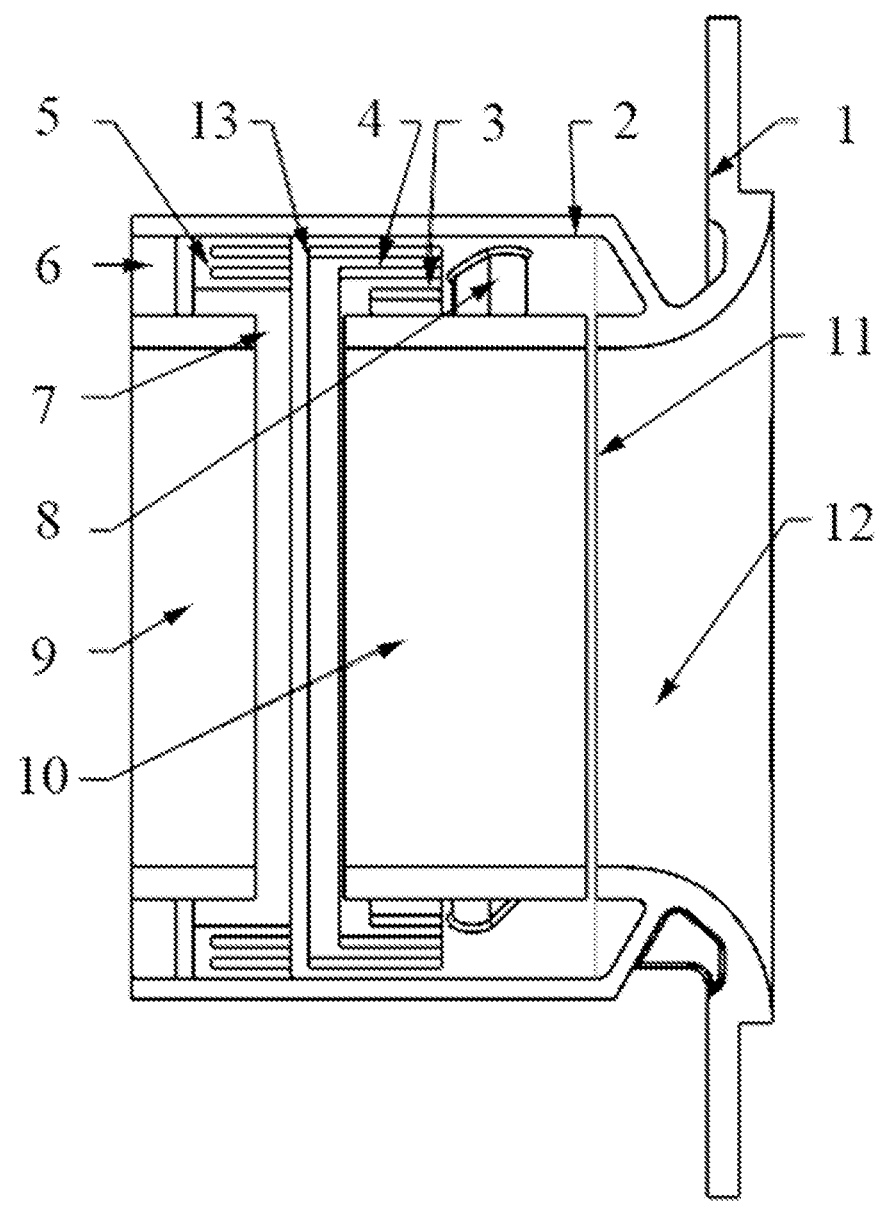
FIG. 8 shows a schematic cross-sectional view of the air intake bypass recirculation structure with adjustable air entraining amount and controllable broadband noise having a three-layer baffle when an annular valve is at a first gear according to an embodiment of the disclosure.
Figure 9:
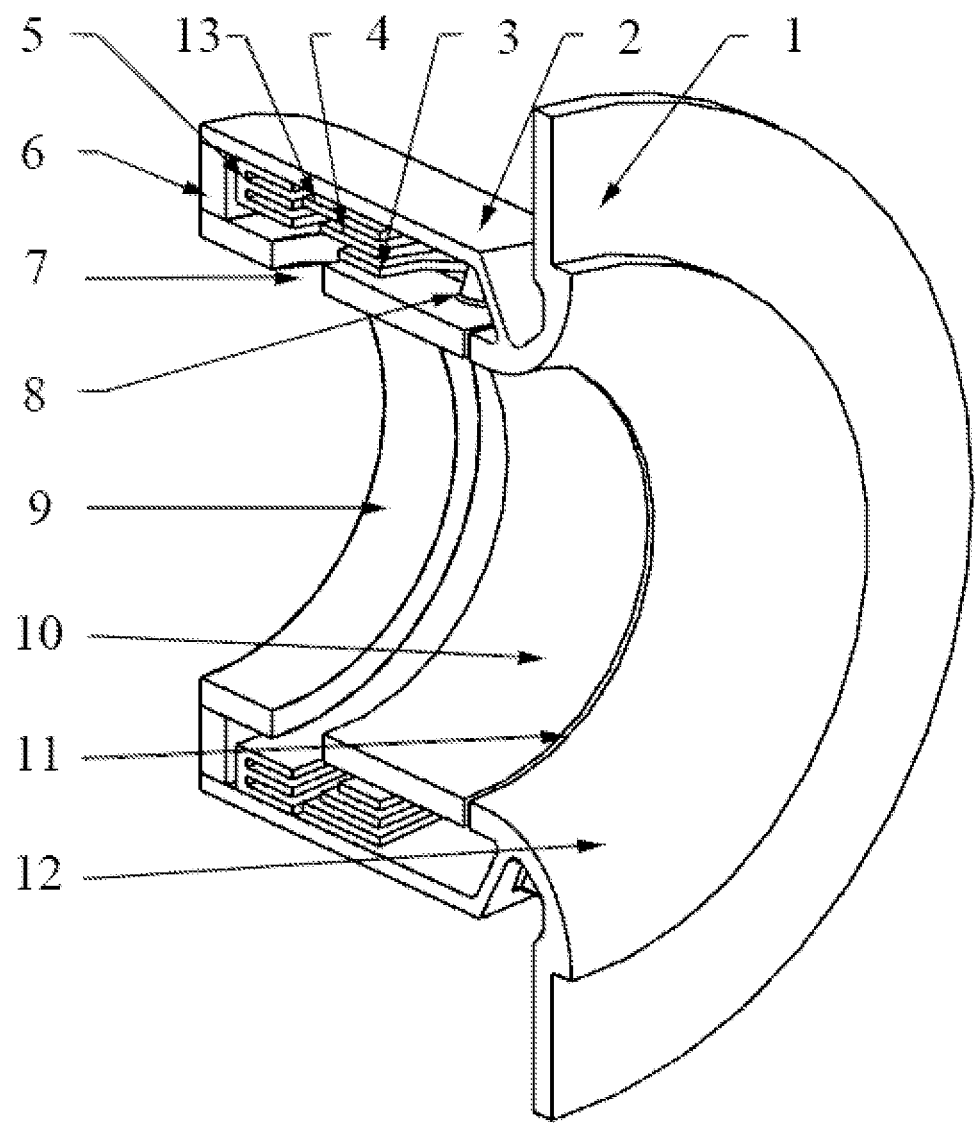
FIG. 9 shows a structural cross-sectional view of the air intake bypass recirculation structure with adjustable air entraining amount and controllable broadband noise having the three-layer baffle when the annular valve is at the first gear according to an embodiment of the disclosure.
Figure 10:
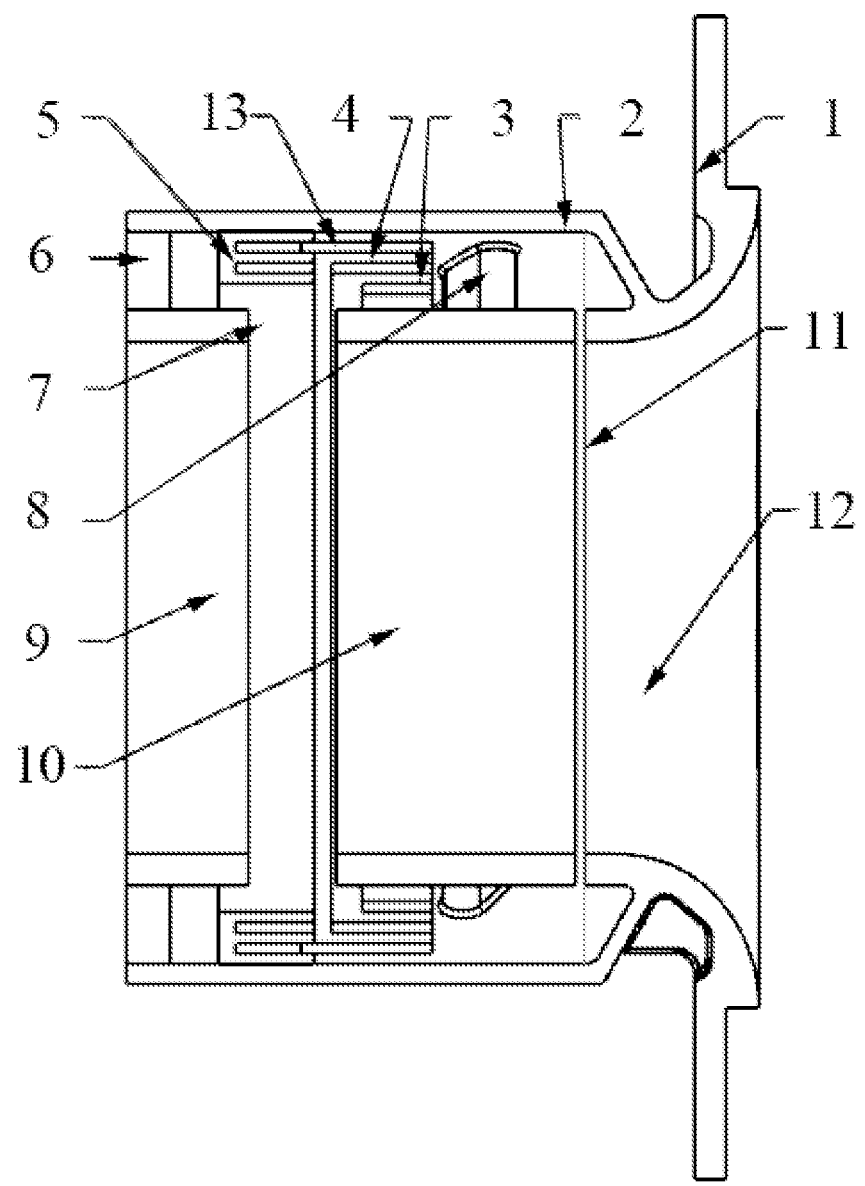
FIG. 10 shows a schematic cross-sectional view of the air intake bypass recirculation structure with adjustable air entraining amount and controllable broadband noise having the three-layer baffle when the annular valve is at a second gear according to an embodiment of the disclosure.
Figure 11:
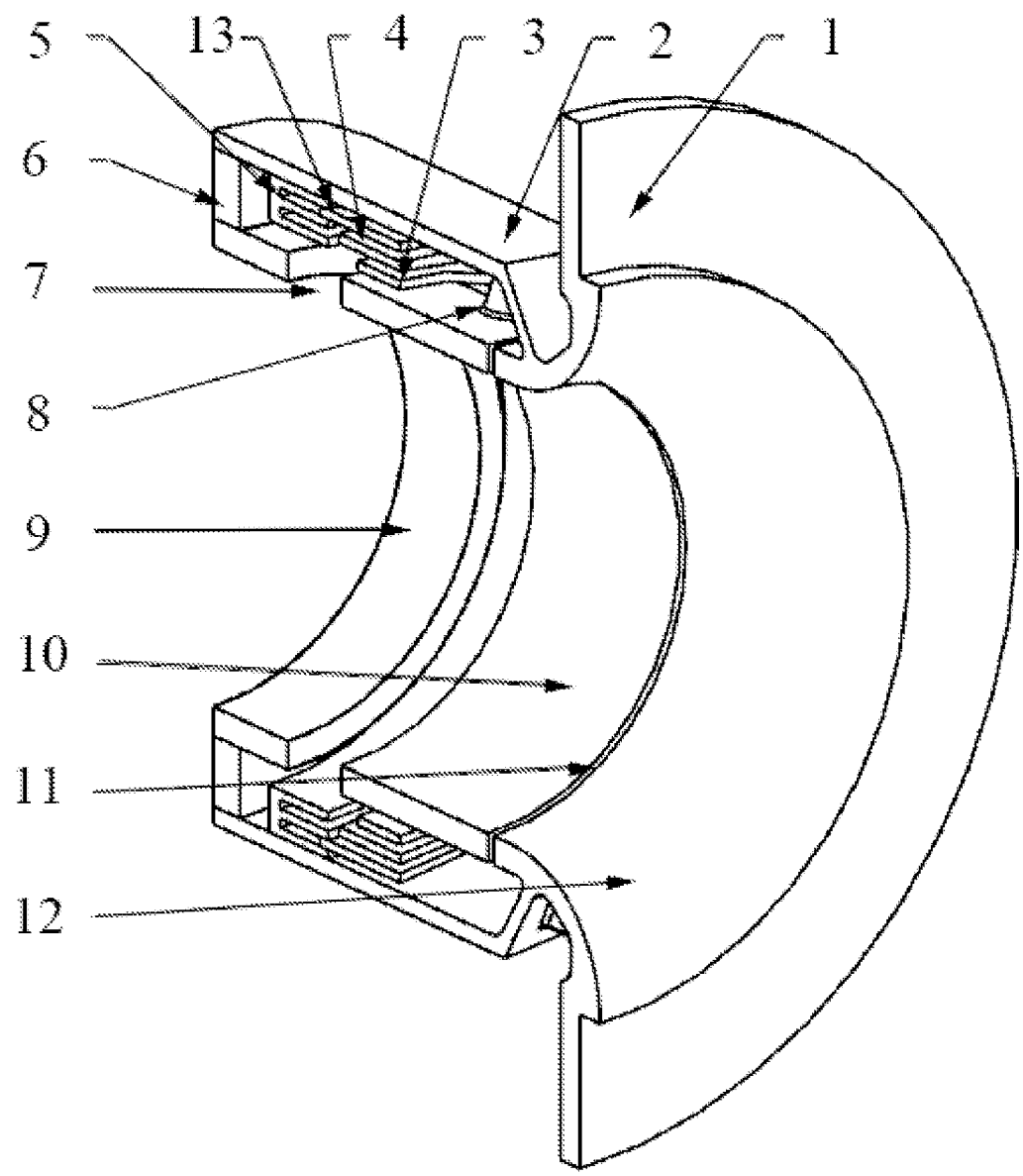
FIG. 11 shows a structural cross-sectional view of the air intake bypass recirculation structure with adjustable air entraining amount and controllable broadband noise having the three-layer baffle when the annular valve is at the second gear according to an embodiment of the disclosure.
Figure 12:
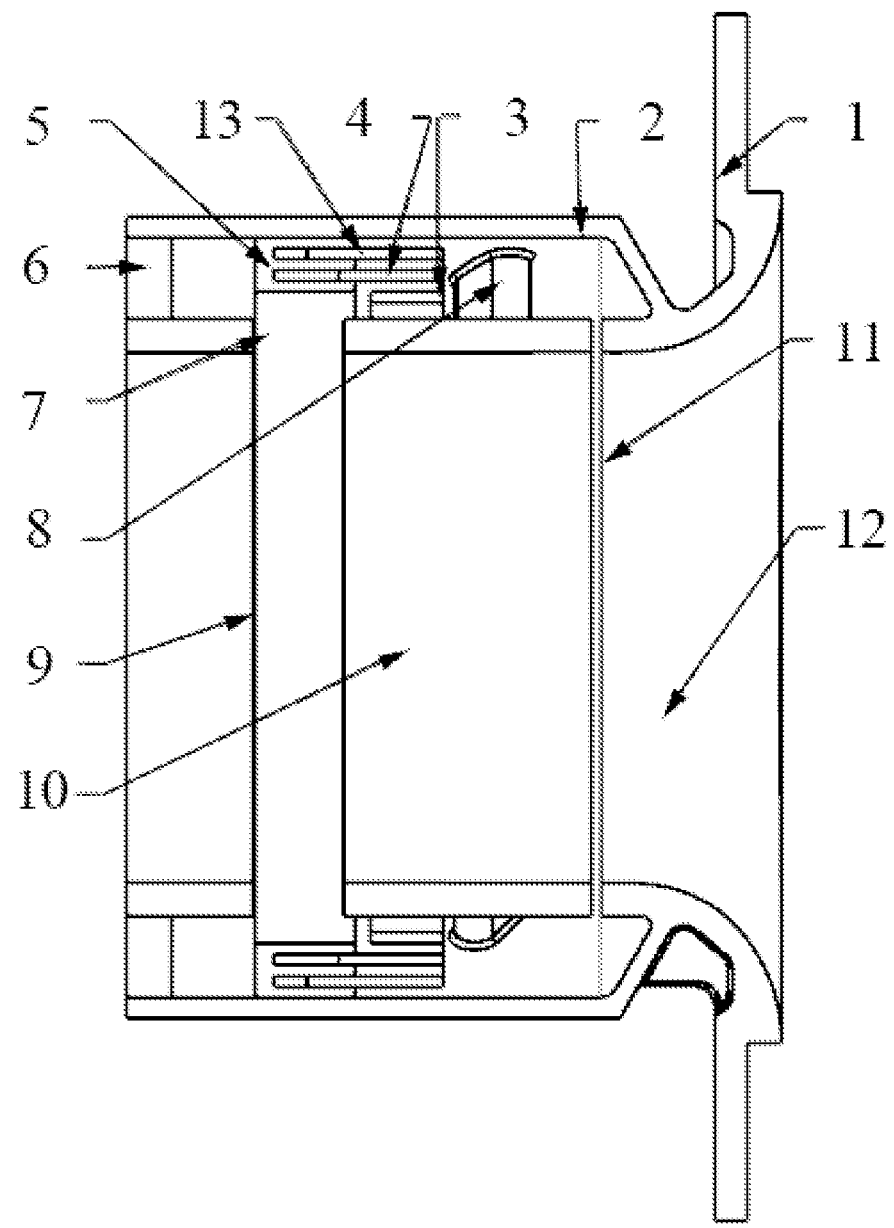
FIG. 12 shows a schematic cross-sectional view of the air intake bypass recirculation structure with adjustable air entraining amount and controllable broadband noise having the three-layer baffle when the annular valve is at a third gear according to an embodiment of the disclosure.
Figure 13:
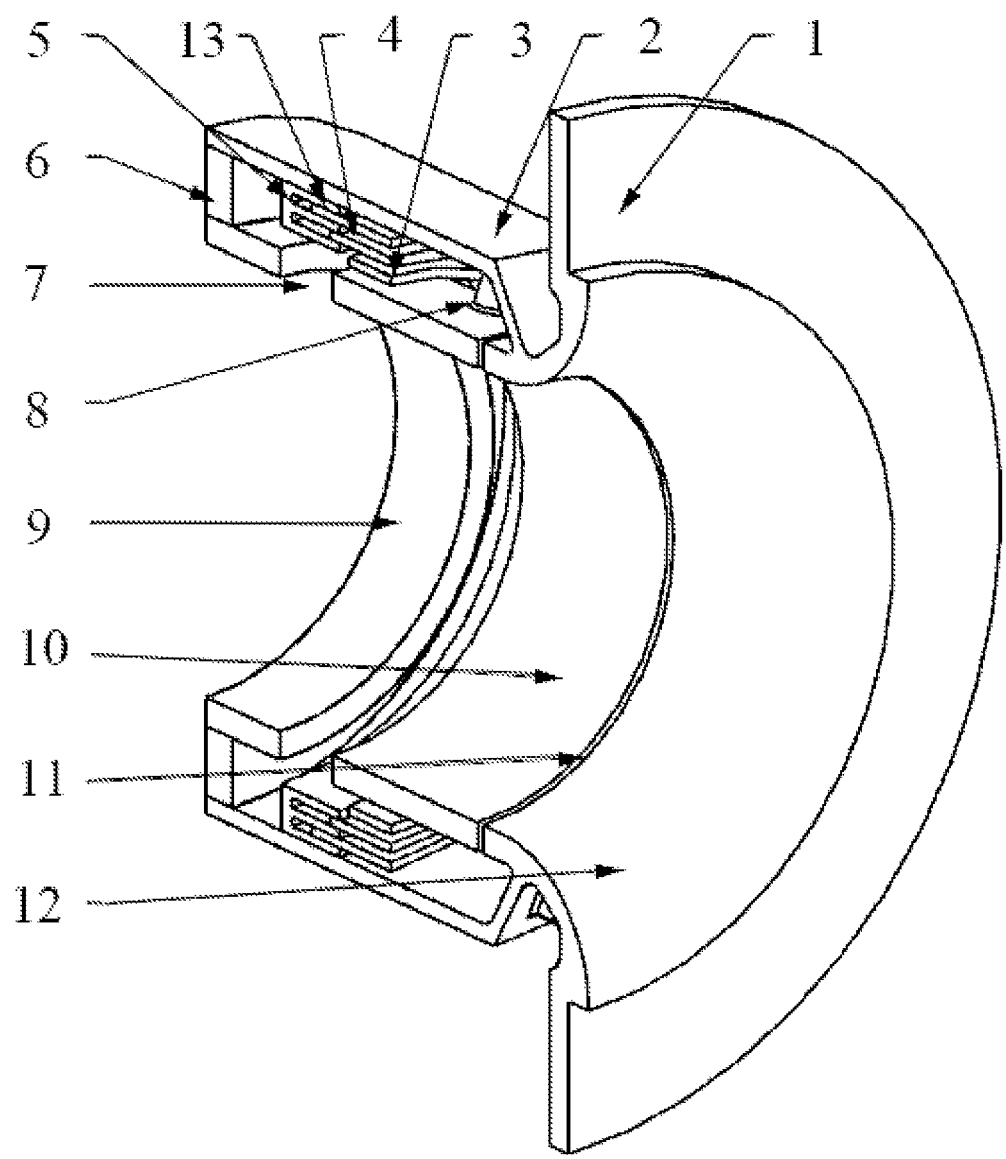
FIG. 13 shows a structural cross-sectional view of the air intake bypass recirculation structure with adjustable air entraining amount and controllable broadband noise having the three-layer baffle when the annular valve is at the third gear according to an embodiment of the disclosure.
Figure 14:
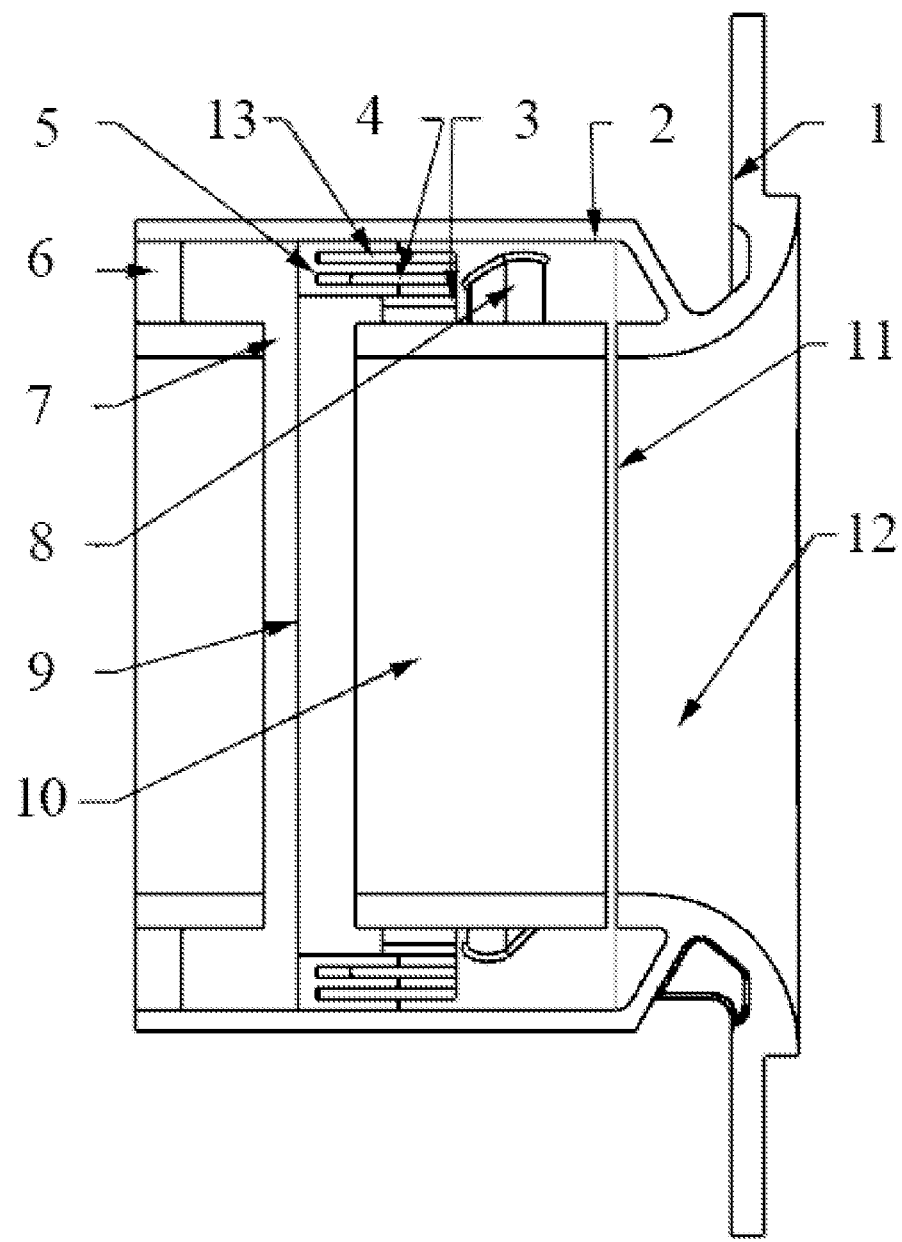
FIG. 14 shows a schematic cross-sectional view of the air intake bypass recirculation structure with adjustable air entraining amount and controllable broadband noise having the three-layer baffle when the annular valve is at a fourth gear according to an embodiment of the disclosure.
Figure 15:
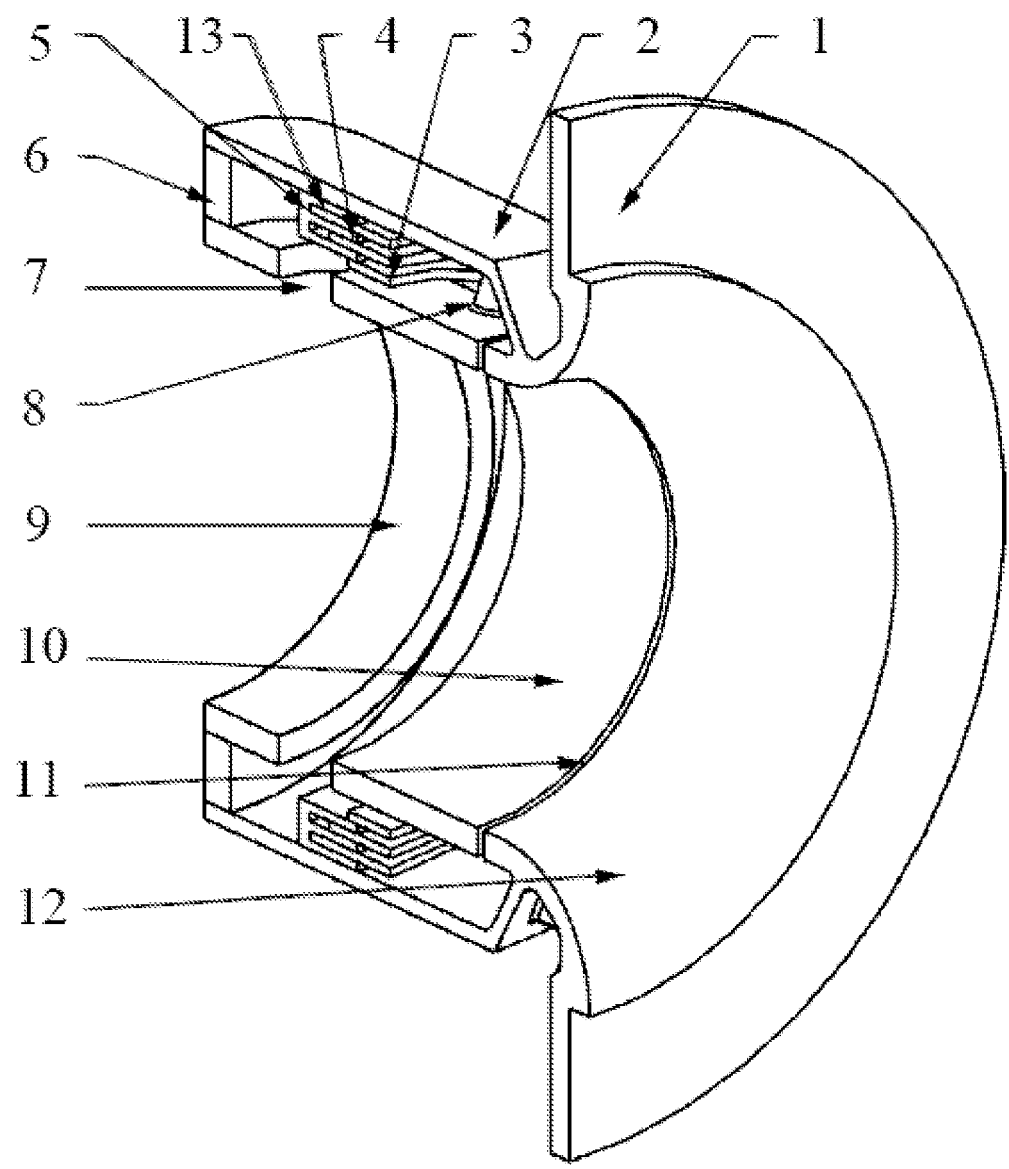
FIG. 15 shows a structural cross-sectional view of the air intake bypass recirculation structure with adjustable air entraining amount and controllable broadband noise having the three-layer baffle when the annular valve is at the fourth gear according to an embodiment of the disclosure.

With reference to FIGS. 1 to 15, in a general air intake bypass recirculation structure, a cavity is simply formed in the outer side of an air intake pipe at an inlet thereof. When an air compressor works near a surge line, excess air is introduced into the cavity, so that the effect of widening a flow range is achieved.

In the present disclosure, intra-cavity airflow baffles and an annular valve 5 are designed in an air intake bypass recirculation cavity. And the position of the annular valve 5 may be adjusted by moving on sliding rails. In one embodiment, the annular valve 5 has three gears. At a first gear, the annular valve 5 is completely opened (located on the side close to an air inlet 9 of an air intake pipe), and air may flow into an air intake bypass recirculation cavity from an airflow inlet 11 of the air intake bypass recirculation structure and then flow out from the spacing between the intra-cavity airflow baffles, so that the circulation area is large. At a second gear, half of the annular valve is closed. An airflow channel between a second intra-cavity airflow baffle 4 and an outer wall 2 of the air intake bypass recirculation structure is closed by the annular valve 5. Air entering the air intake bypass recirculation cavity from the airflow inlet 11 of the air intake bypass recirculation structure may only flow out of the air intake bypass recirculation cavity from an airflow channel between a first intra-cavity airflow baffle 3 and the second intra-cavity airflow baffle 4 and an airflow channel between the first intra-cavity airflow baffle 3 and an inner wall 10 of the air intake bypass recirculation structure, so that the circulation area is medium. At a third gear, the annular valve 5 is completely closed. The airflow channel between the second intra-cavity airflow baffle 4 and the outer wall 2 of the air intake bypass recirculation structure and the airflow channel between the second intra-cavity airflow baffle 4 and the first intra-cavity airflow baffle 3 are closed at the same time by the annular valve 5. The air entering the air intake bypass recirculation cavity from the airflow inlet 11 of the air intake bypass recirculation structure may only flow out of the air intake bypass recirculation cavity from the airflow channel between the first intra-cavity airflow baffle 3 and the inner wall 10 of the air intake bypass recirculation structure, so that the circulation area is small.

In this way, the air entraining amount of the air intake bypass recirculation structure may be adjusted.

As mentioned above, the annular valve 5 may be at three gears, including a completely open gear, a half closed gear and a completely closed gear, corresponding to large air intake, medium air intake and small air intake, respectively. The position of the annular valve 5 is controlled by the control system. The control system judges the current working state of the air compressor by reading the results of four sensors of the air compressor (namely, an outlet pressure sensor 14, an outlet temperature sensor 15, an inlet pressure sensor 16 and an inlet temperature sensor 17) and combining with the rotating speed of the air compressor. When the air compressor works near the surge line, the noise is loud. At the same time, in order to maintain a stable working state, it is necessary to increase airflow passing through the air intake bypass recirculation structure, and in this case, the control system controls the annular valve 5 at the first gear to ensure the maximum flow rate. When the air compressor works in a working condition away from the surge line, the noise is small, and it is not necessary to introduce air into the air intake bypass recirculation structure to maintain a stable working state. Therefore, the control system controls the annular valve 5 to be at the third gear to maintain the minimum flow rate.

The noise of the air intake pipe of a turbocharger is mainly caused by rotor-stator interaction, that is, is mainly generated at the junction of a rotating impeller and an outlet of the air intake pipe. While, the airflow inlet 11 of the air intake bypass recirculation structure is usually formed in one side, close to the impeller, at the junction of the rotating impeller and the outlet of the air intake pipe, and is not far from the junction. The noise generated in this way is transmitted through the air intake pipe and the air intake bypass recirculation structure.

In the present disclosure, the intra-cavity airflow baffles and the annular valve 5 are designed in the air intake bypass recirculation cavity. The position of the annular valve 5 may be adjusted by moving on the sliding rails.

When the annular valve 5 is completely opened (located on the side close to the air inlet 9 of the air intake pipe), noise sound waves may be transmitted into the air intake bypass recirculation cavity from the airflow inlet 11 of the air intake bypass recirculation structure, and then transmitted respectively from ends of different intra-cavity airflow baffles. Here, the wavelength of noise sound waves is $\lambda$. The axial distance from the airflow inlet 11 of the air intake bypass recirculation structure to the airflow outlet 7 of the air intake bypass recirculation structure is $l_1$. The axial distance from the airflow inlet 11 of the air intake bypass recirculation structure to an outlet of the airflow channel between the second intra-cavity airflow baffle 4 and the outer wall 2 of the air intake bypass recirculation structure is $l_2$. A proper distance is set as follows.

$$l_2 - l_1 = n\lambda \tfrac{1}{2}\lambda$$

In this way, there is a half wavelength difference between the noise sound waves transmitted from the airflow outlet 7 of the air intake bypass recirculation structure and the outlet of the airflow channel between the second intra-cavity airflow baffle 4 and the outer wall 2 of the air intake bypass recirculation structure. Considering interference between two rows of sound waves, the peak of the one sound wave coincide with the valley of the other sound wave, and the effect of reducing the amplitude is achieved, so that the effect of reducing the noise is achieved.

When the annular valve 5 moves to the second gear, the airflow channel between the second intra-cavity airflow baffle 4 and the outer wall 2 of the air intake bypass recirculation structure is closed, and the noise sound waves entering the air intake bypass recirculation cavity from the air inlet 11 of the air intake bypass recirculation structure may only be transmitted out of the air intake bypass recirculation cavity from the other two airflow channels. Therefore, there are no more two rows of sound waves to be transmitted, and no sound wave interference is generated. However, the airflow channel between the second intra-cavity airflow baffle 4 and the outer wall 2 of the air intake bypass recirculation structure constitutes a resonator. The wavelength of the noise sound wave is λ. The cross-sectional area of the resonator composed of the annular valve 5, the intra-cavity airflow baffles and the outer wall 2 of the air intake bypass recirculation structure is IS. The cross-sectional area of the cavity that may still allow air to flow is $S_1$. The length of the intra-cavity airflow baffle is l, and then the transmission loss when the sound waves pass through the structure is as follows.

$$TL = 10\log_{10}\left[1 + \frac{1}{4}\left(\frac{S}{S_1}\right)^2 \cdot \tan^2\left(\frac{2\pi l}{\lambda}\right)\right]$$

Therefore, the structure may play a role in reducing the noise.

In a first specific embodiment, with reference to FIGS. 2 to 15, the air intake bypass recirculation structure with adjustable air entraining amount and controllable broadband noise may include main body of the air intake bypass recirculation structure and an air entraining amount adjusting structure. The main body of the air intake bypass recirculation structure is of a circular tubular structure. An air intake bypass recirculation cavity is formed in the main body of the air intake bypass recirculation structure along the circumferential direction. The air intake bypass recirculation cavity is a circular annular cavity. An air inlet 9 of the air intake pipe and an air outlet 12 of the air intake pipe are formed in two ends of an inner hole of the main body of the air intake bypass recirculation structure respectively. The airflow inlet 11 of the air intake bypass recirculation structure is formed in the side, close to the air outlet 12 of the air intake pipe, of an inner side face of the main body of the air intake bypass recirculation structure. An airflow outlet 7 of the air intake bypass recirculation structure is formed in the side, close to the air inlet 9 of the air intake pipe, of the inner side face of the main body of the air intake bypass recirculation structure. The airflow inlet 11 of the air intake bypass recirculation structure and the airflow outlet 7 of the air intake bypass recirculation structure are both communicated with the air intake bypass recirculation cavity. The air entraining amount adjusting structure is arranged in the air intake bypass recirculation cavity and located at the airflow outlet 7 of the air intake bypass recirculation structure. The air circulation area in the air intake bypass recirculation cavity is changed through the air entraining amount adjusting structure, and then the air entraining amount of the main body of the air intake bypass recirculation structure is adjusted.

In a second specific embodiment, with reference to FIGS. 2 to 15, the main body of the air intake bypass recirculation structure may include an air intake pipe flange 1, the outer wall 2 of the air intake bypass recirculation structure, a sealed mouth 6 of the air intake bypass recirculation structure, an inner wall 10 of the air intake bypass recirculation structure and multiple inner and outer wall connecting columns 8. The outer wall 2 of the air intake bypass recirculation structure and the inner wall 10 of the air intake bypass recirculation structure are both of circular tubular structures. One end of the inner wall 10 of the air intake bypass recirculation structure is fixedly connected with an end face of the air intake pipe flange 1. The outer wall 2 of the air intake bypass recirculation structure sleeves the inner wall 10 of the air intake bypass recirculation structure. One end of the outer wall 2 of the air intake bypass recirculation structure is fixedly connected with the air intake pipe flange 1. An outer side face of the end, away from the air intake pipe flange 1, of the inner wall 10 of the air intake bypass recirculation structure is fixedly connected with an inner side face of the outer wall 2 of the air intake bypass recirculation structure through the sealed mouth 6 of the air intake bypass recirculation structure. An outer side face of the end, close to the air intake pipe flange 1, of the inner wall 10 of the air intake bypass recirculation structure is fixedly connected with the inner side face of the outer wall 2 of the air intake bypass recirculation structure through the inner and outer wall connecting columns 8. The air intake bypass recirculation cavity is formed by the air intake pipe flange 1, the outer wall 2 of the air intake bypass recirculation structure, the sealed mouth 6 of the air intake bypass recirculation structure and the inner wall 10 of the air intake bypass recirculation structure. Other constituting and connecting relationships are the same as those in the first specific embodiment.

In a third specific embodiment, with reference to FIGS. 2 to 15, the inner wall 10 of the air intake bypass recirculation structure, the outer wall 2 of the air intake bypass recirculation structure and the air intake pipe flange 1 are coaxially arranged. Other constituting and connecting relationships are the same as those in the first or second specific embodiment.

In a fourth specific embodiment, with reference to FIGS. 2 to 15, the air inlet 9 of the air intake pipe is formed in the end, away from the air intake pipe flange 1, of the inner wall 10 of the air intake bypass recirculation structure. The air outlet 12 of the air intake pipe is formed in the end, close to the air intake pipe flange 1, of the inner wall 10 of the air intake bypass recirculation structure. Other constituting and connecting relationships are the same as those in the first, second or third specific embodiment.

In a fifth specific embodiment, with reference to FIGS. 2 to 15, the air intake adjusting structure may include an annular valve 5 and N intra-cavity airflow baffles with increasing diameters from inside to outside, multiple sliding rails and multiple baffle connecting columns. N is greater than or equal to 2 and is a positive integer. The intra-cavity airflow baffles are of a circular annular tubular structure. The N intra-cavity airflow baffles are coaxially sleeved in the air intake bypass recirculation cavity between the inner wall 10 of the air intake bypass recirculation structure and the outer wall 2 of the air intake bypass recirculation structure from inside to outside. The lengths of the ends, close to the airflow outlet 7 of the air intake bypass recirculation structure, of the N intra-cavity airflow baffles increase from inside to outside. The ends, away from the airflow outlet 7 of the air intake bypass recirculation structure, of the N intra-cavity airflow baffles are flush and fixedly connected with an inner surface of the outer wall 2 of the air intake bypass recirculation structure through the baffle connecting columns. The annular valve 5 is sleeved in the air intake bypass recirculation cavity between the inner wall 10 of the air intake bypass recirculation structure and the outer wall 2 of the air intake bypass recirculation structure. The annular valve 5 is located on the side, close to the airflow outlet 7 of the air intake bypass recirculation structure, of the N intra-cavity airflow baffles. The inner surface of the outer wall 2 of the air intake bypass recirculation structure is fixedly connected with multiple sliding rails along the circumferential direction. Multiple chutes respectively matched with the sliding rails are formed in an outer surface of the annular valve 5 along the circumferential direction. The annular valve is slidably installed on the outer wall 2 of the air intake bypass recirculation structure through the sliding rails and may move along the axial direction through the sliding rails. N-1 annular slots respectively matched with the intra-cavity airflow baffles are axially formed in the end, close to the intra-cavity airflow baffles, of the annular valve 5. In this way, the structures such as the intra-cavity airflow baffles and the annular valve 5 are arranged in the air intake bypass recirculation cavity. The intra-cavity airflow baffles are fixed together with the outer wall 2 of the air intake bypass recirculation structure through the baffle connecting columns. The annular valve 5 is connected with the outer wall 2 of the air intake bypass recirculation structure through the sliding rails, and may move along the axial direction through the sliding rails, so that the internal structure of the air intake bypass recirculation cavity is changed, the airflow is affected, the transmitted sound waves are also affected, and the effects of adjusting the air entraining amount of the air intake bypass recirculation structure and controlling the noise are achieved. Other constituting and connecting relationships are the same as those in the first, second or fourth specific embodiment. Considering the sealing problem, specifically, a motor installed in the air intake bypass recirculation cavity may be used as a driving component for driving the annular valve 5, which is not imposed here.

In a sixth specific embodiment, with reference to FIGS. 2 to 7, when the quantity of the intra-cavity airflow baffles is 2, the two intra-cavity airflow baffles may include the first intra-cavity airflow baffle 3 and the second intra-cavity airflow baffle 4 respectively. In this embodiment, one annular slot is formed in the annular valve 5. The annular valve 5 is divided into two annular inserting plates arranged coaxially through the annular slot. The length difference between the second intra-cavity airflow baffle 4 and the first intra-cavity airflow baffle 3 is smaller than the depth of the annular slot. In this way, when the quantity of the intra-cavity airflow baffles is 2, the annular valve 5 may be at three gears, including a completely open gear, a half closed gear and a completely closed gear, corresponding to large air intake, medium air intake and small air intake, respectively. Other constituting and connecting relationships are the same as those in the first, second, third or fourth specific embodiment.

In a seventh specific embodiment, with reference to FIGS. 2 to 7, the two annular inserting plates are equal in length along an axial direction of the annular valve. The spacing between the first intra-cavity airflow baffle 3 and the second intra-cavity airflow baffle 4 and the spacing between the second intra-cavity airflow baffle 4 and the outer wall 2 of the air intake bypass recirculation structure are equal. The annular inserting plates are in sliding seal fit with the first intra-cavity airflow baffle 3, the second intra-cavity airflow baffle 4 and/or the outer wall 2 of the air intake bypass recirculation structure. Other constituting and connecting relationships are the same as those in the first, second, third, fourth or fifth specific embodiment.

In an eighth specific embodiment, with reference to FIGS. 8 to 15, when the quantity of the intra-cavity airflow baffles is 3, the three intra-cavity airflow baffles may include a first intra-cavity airflow baffle 3, a second intra-cavity airflow baffle 4 and a third intra-cavity airflow baffle 13 respectively. In this embodiment, two annular slots are formed in the annular valve 5. The annular valve 5 is divided into three annular inserting plates arranged coaxially through the two annular slots. The length difference between the third intra-cavity airflow baffle 13 and the first intra-cavity airflow baffle 3 is smaller than the depth of the annular slot. In this way, when the quantity of the intra-cavity airflow baffles is 3, the annular valve 5 may be at four gears. Other constituting and connecting relationships are the same as those in the first, second, third, fourth, fifth, sixth or seventh specific embodiment.

The differences between the structure described in the eighth specific embodiment and the structure described in the sixth specific embodiment are as follows. In the eighth specific embodiment, three intra-cavity airflow baffles with different lengths, including a first intra-cavity airflow baffle 3, a second intra-cavity airflow baffle 4 and a third intra-cavity airflow baffle 13, are arranged in the air intake bypass recirculation cavity, so that when the annular valve 5 is moved from the first gear to the fourth gear, the airflow channel between the third intra-cavity airflow baffle 13 and the outer wall 2 of the air intake bypass recirculation structure, the airflow channel between the second intra-cavity airflow baffle 4 and the third intra-cavity airflow baffle 13 and the airflow channel between the second intra-cavity airflow baffle 4 and the first intra-cavity airflow baffle 3 are closed in sequence. In the moving process, the structure still realizes the functions of adjusting the air entraining amount and reducing the noise mentioned in the effect, and the structure may adapt to more working conditions due to the increase of the quantity of baffles and the increase of gears.

The quantity of the intra-cavity airflow baffles in the above structure is not unchanged, so more baffle structures may be added when the space in the cavity allows, and the annular valve in a corresponding shape may be installed at the same time so that the air intake bypass recirculation structure has more gears and adapt to more working conditions.

In a ninth specific embodiment, with reference to FIGS. 8 to 15, the three annular inserting plates are equal in length along the axial direction of the annular valve. The spacing between the first intra-cavity airflow baffle 3 and the second intra-cavity airflow baffle 4, the spacing between the second intra-cavity airflow baffle 4 and the third intra-cavity airflow baffle 13 and the spacing between the third intra-cavity airflow baffle 13 and the outer wall 2 of the air intake bypass recirculation structure are equal. The annular inserting plates are in sliding seal fit with the first intra-cavity airflow baffle 3, the second intra-cavity airflow baffle 4, the third intra-cavity airflow baffle 13 and/or the outer wall 2 of the air intake bypass recirculation structure. Other constituting and connecting relationships are the same as those in the first, second, third, fourth, fifth, sixth, seventh or eighth specific embodiment.

In a tenth specific embodiment, with reference to FIGS. 1 to 7, the air entraining amount adjusting structure in the embodiment may also include a control system, an outlet pressure sensor 14 of an air compressor, an outlet temperature sensor 15 of the air compressor, an inlet pressure sensor 16 of the air compressor, an inlet temperature sensor 17 of the air compressor and an annular valve control module 18. The outlet pressure sensor 14 and the outlet temperature sensor 15 are both installed on an outlet pipeline of the air compressor, and are respectively connected with the control system through wires. The inlet pressure sensor 16, the inlet temperature sensor 17 and the annular valve control module 18 are all installed on the air intake bypass recirculation structure, and are respectively connected with the control system through wires. In this way, the position of the annular valve 5 is controlled by the control system. The control system judges the current working state of the air compressor by reading the results of four sensors of the air compressor, namely, the outlet pressure sensor 14, the outlet temperature sensor 15, the inlet pressure sensor 16 and the inlet temperature sensor 17, and combining with the rotating speed of the air compressor. When the air compressor works near the surge line, the noise is loud. At the same time, in order to maintain a stable working state, it is necessary to increase airflow passing through the air intake bypass recirculation structure. In this embodiment, the control system controls the annular valve 5 at the first gear to ensure the maximum flow rate. When the air compressor works in a working condition away from the surge line, the noise is small, and it is not necessary to introduce air into the air intake bypass recirculation structure to maintain a stable working state. Therefore, the control system controls the annular valve 5 to be at the third gear to maintain the minimum flow rate. Other constituting and connecting relationships are the same as those in the first, second, third, fourth, fifth, sixth, seventh eighth or ninth specific embodiment. Considering the sealing problem, specifically, a motor installed in the air intake bypass recirculation cavity may be used as the annular valve control module 18, which is not imposed here.

The working principle is as follows.

With reference to FIGS. 1 to 15, according to the working principle of the air intake bypass recirculation structure with adjustable air entraining amount and controllable broadband noise, an opening of the airflow inlet 11 of the air intake bypass recirculation structure is formed in the side, close to the air outlet 12 of the air intake pipe, of the inner wall 10 of the air intake bypass recirculation structure. An opening of the airflow outlet 7 of the air intake bypass recirculation structure is formed in the side, close to the air inlet 9 of the air intake pipe, of the inner wall 10 of the air intake bypass recirculation structure. Airflow may enter the air intake bypass recirculation cavity through the airflow inlet 11 of the air intake bypass recirculation structure, flow out from the airflow outlet 7 of the air intake bypass recirculation structure, and then flow to the impeller for pressurization again.

In the present disclosure, the intra-cavity airflow baffles and the annular valve 5 are arranged in the air intake bypass recirculation cavity. The intra-cavity airflow baffles are fixed together with the outer wall 2 of the air intake bypass recirculation structure through the baffle connecting columns. The annular valve 5 is connected with the outer wall 2 of the air intake bypass recirculation structure through the sliding rails, and may move along the axial direction through the sliding rails, so that the internal structure of the air intake bypass recirculation cavity is changed, the airflow is affected, the transmitted sound waves are also affected, and the effects of adjusting the air entraining amount of the air intake bypass recirculation structure and controlling the noise are achieved.

Various embodiments of the disclosure may have one or more of the following effects. In some embodiments, the disclosure may provide an air intake bypass recirculation structure with adjustable air entraining amount and controllable broadband noise, which may help to solve the problem that an air compressor of an existing turbocharged engine has a large generated noise. In other embodiments, the internal structure of the air intake bypass recirculation cavity may be changed, so that airflow passing through the air intake bypass recirculation cavity may be affected, transmitted sound waves may also be affected, and the effects of adjusting the air entraining amount of the air intake bypass recirculation structure and controlling noise may be achieved.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. An air intake bypass recirculation structure with adjustable air entraining amount and controllable broadband noise, comprising a main body of the air intake bypass recirculation structure and an air entraining amount adjusting structure, wherein:
    an air intake bypass recirculation cavity is formed in the main body of the air intake bypass recirculation structure along a circumferential direction;
    an air inlet of an air intake pipe and an air outlet of the air intake pipe are formed in two ends of an inner hole of the main body of the air intake bypass recirculation structure respectively;
    an airflow inlet of the air intake bypass recirculation structure is formed in one side, closer to the air outlet of the air intake pipe than to the air inlet of the air intake pipe, of an inner side face of the main body of the air intake bypass recirculation structure;
    an airflow outlet of the air intake bypass recirculation structure is formed in another side, closer to the air inlet of the air intake pipe than to the air outlet of the air intake pipe, of the inner side face of the main body of the air intake bypass recirculation structure;
    the airflow inlet of the air intake bypass recirculation structure and the airflow outlet of the air intake bypass recirculation structure are both communicated with the air intake bypass recirculation cavity;
    the air entraining amount adjusting structure is arranged in the air intake bypass recirculation cavity and located at the airflow outlet of the air intake bypass recirculation structure;
    an air circulation area in the air intake bypass recirculation cavity is changed through the air entraining amount adjusting structure to adjust the air entraining amount of the main body of the air intake bypass recirculation structure;
    an air intake adjusting structure comprises an annular valve and N intra-cavity airflow baffles with increasing diameters from inside to outside;
    the N intra-cavity airflow baffles are coaxially sleeved in the air intake bypass recirculation cavity between an inner wall of the air intake bypass recirculation structure and an outer wall of the air intake bypass recirculation structure from inside to outside;
lengths of the N intra-cavity airflow baffles increase from inside to outside;
ends, away from the airflow outlet of the air intake bypass recirculation structure, of the N intra-cavity airflow baffles are flush and connected with an inner surface of an outer wall of the air intake bypass recirculation structure through baffle connecting columns;
the annular valve is sleeved in the air intake bypass recirculation cavity between the inner wall of the air intake bypass recirculation structure and the outer wall of the air intake bypass recirculation structure;
the annular valve is located at one side, closer to the airflow outlet of the air intake bypass recirculation structure than to the airflow inlet of the air intake bypass recirculation structure, of the N intra-cavity airflow baffles;
the inner surface of the outer wall of the air intake bypass recirculation structure is connected with sliding rails along the circumferential direction;
chutes respectively matched with the sliding rails are formed in an outer surface of the annular valve along the circumferential direction;
the annular valve is slidably installed on the outer wall of the air intake bypass recirculation structure through the sliding rails and moves along an axial direction through the sliding rails; and
N-1 annular slots matched with the intra-cavity airflow baffles are axially formed in one end, closer the intra-cavity airflow baffles than to a sealed mouth of the air intake bypass recirculation structure, of the annular valve.

2. The air intake bypass recirculation structure with adjustable air entraining amount and controllable broadband noise according to claim 1, wherein:
the main body of the air intake bypass recirculation structure comprises an air intake pipe flange, an outer wall of the air intake bypass recirculation structure, the sealed mouth of the air intake bypass recirculation structure, and an inner wall of the air intake bypass recirculation structure;
one end of the inner wall of the air intake bypass recirculation structure is connected with an end face of the air intake pipe flange;
the outer wall of the air intake bypass recirculation structure sleeves the inner wall of the air intake bypass recirculation structure;
one end of the outer wall of the air intake bypass recirculation structure is connected with the air intake pipe flange;
an outer side face of another end, away from the air intake pipe flange, of the inner wall of the air intake bypass recirculation structure is connected with an inner side face of the outer wall of the air intake bypass recirculation structure through the sealed mouth of the air intake bypass recirculation structure;
an outer side face of the end of the inner wall of the air intake bypass recirculation structure is connected with the inner side face of the outer wall air intake bypass recirculation structure through inner and outer wall connecting columns; and
the air intake bypass recirculation cavity is formed by the air intake pipe flange, the outer wall of the air intake bypass recirculation structure, the sealed mouth of the air intake bypass recirculation structure, and the inner wall of the air intake bypass recirculation structure.

3. The air intake bypass recirculation structure with adjustable air entraining amount and controllable broadband noise according to claim 1, wherein an inner wall of the air intake bypass recirculation structure, an outer wall of the air intake bypass recirculation structure, and an air intake pipe flange are coaxially arranged.

4. The air intake bypass recirculation structure with adjustable air entraining amount and controllable broadband noise according to claim 1, wherein, when N is 2:
the intra-cavity airflow baffles comprise a first intra-cavity airflow baffle and a second intra-cavity airflow baffle;
one annular slot is formed in the annular valve;
the annular valve is divided into two annular inserting plates arranged coaxially through the annular slot; and
a length difference between the second intra-cavity airflow baffle and the first intra-cavity airflow baffle is smaller than a depth of the annular slot.

5. The air intake bypass recirculation structure with adjustable air entraining amount and controllable broadband noise according to claim 4, wherein:
the annular inserting plates are equal in length along an axial direction of the annular valve;
a spacing between the first intra-cavity airflow baffle and the second intra-cavity airflow baffle and a spacing between the second intra-cavity airflow baffle and the outer wall of the air intake bypass recirculation structure are equal; and
the two annular inserting plates are in sliding seal fit with the first intra-cavity airflow baffle, the second intra-cavity airflow baffle, or the outer wall of the air intake bypass recirculation structure.

6. The air intake bypass recirculation structure with adjustable air entraining amount and controllable broadband noise according to claim 1, wherein, when N is 3:
the intra-cavity airflow baffles comprise a first intra-cavity airflow baffle, a second intra-cavity airflow baffle, and a third intra-cavity airflow baffle;
two annular slots are formed in the annular valve;
the annular valve is divided into three annular inserting plates arranged coaxially through the two annular slots; and
a length difference between the third intra-cavity airflow baffle and the first intra-cavity airflow baffle is smaller than a depth of the two annular slots.

7. The air intake bypass recirculation structure with adjustable air entraining amount and controllable broadband noise according to claim 6, wherein:
the annular inserting plates are equal in length along an axial direction of the annular valve;
a spacing between the first intra-cavity airflow baffle and the second intra-cavity airflow baffle, a spacing between the second intra-cavity airflow baffle and the third intra-cavity airflow baffle, and a spacing between the third intra-cavity airflow baffle and the outer wall of the air intake bypass recirculation structure are equal; and
the three annular inserting plates are in sliding seal fit with the first intra-cavity airflow baffle, the second intra-cavity airflow baffle, the third intra-cavity airflow baffle, or the outer wall of the air intake bypass recirculation structure.

* * * * *